Feb. 10, 1925.
W. H. EVANS
1,525,538
FABRIC HOSE COUPLING
Filed Aug. 9, 1924
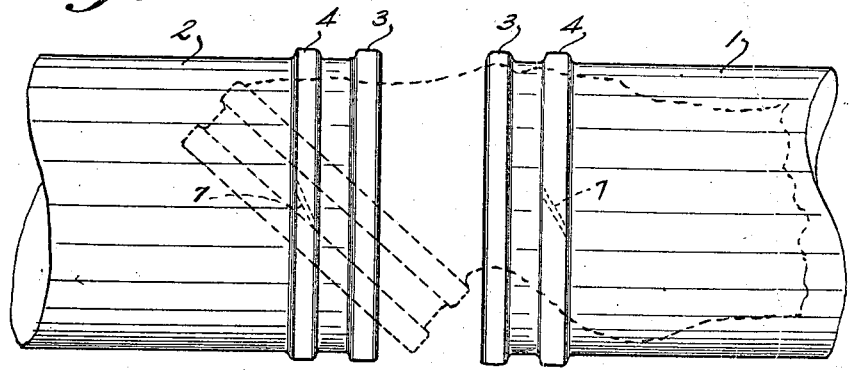
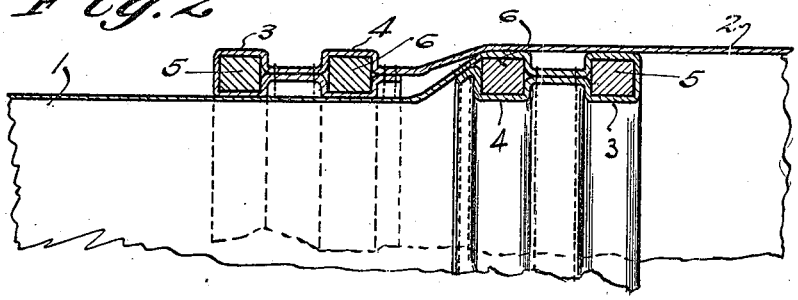
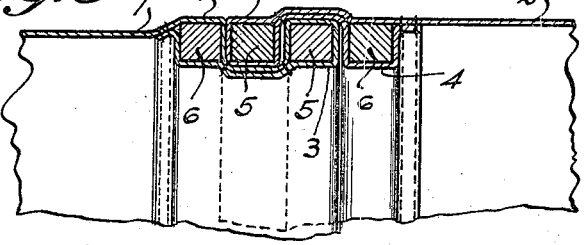
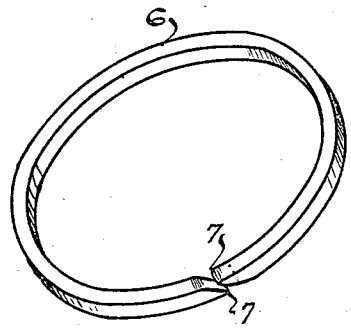
Inventor
W. H. EVANS.
By
Attorney Patented Feb. 10, 1925.

1,525,538

UNITED STATES PATENT OFFICE.

WILLIAM HOOPER EVANS, OF BIRMINGHAM, ALABAMA.

FABRIC-HOSE COUPLING.

Application filed August 9, 1924. Serial No. 731,184.

*To all whom it may concern:*

Be it known that I, WILLIAM H. EVANS, a citizen of the United States of America, residing at Birmingham, in the county of Jefferson and State of Alabama, have invented certain new and useful Improvements in Fabric-Hose Couplings, of which the following is a specification.

My invention relates to a new and improved coupling for flexible fabric hose such as is in general use for mine ventilation.

The object of my invention is to design a coupling which will be easy to manufacture, less expensive than those now in general use, and which in a novel and effective manner will prevent any relative displacement or disengaging of solid rings forming the positive acting interlocked elements of the coupling.

More particularly my invention contemplates the utilization of a solid unsplit ring at the outer end of each section to be coupled, this ring being of any standard cross section that is cheap and generally available. I associate with this ring in at least one coupling element, but preferably in both, a split ring, the latter also being of any standard section and arranged so as to receive the solid ring of the other coupling element between it and the solid ring in its respective coupling element.

My invention further contemplates the assembling of the spaced rings in a hose end by stitching them into spaced parallel pockets formed by doubling back the hose end on itself.

My invention further comprises the novel details of construction and arrangements of parts, which in their preferred embodiment only are illustrated in the accompanying drawings which form a part of this specification, and in which:—

Fig. 1 is a side elevation of two hose coupling elements about to be coupled, the dotted lines showing the manner of introducing the ring or rings of one coupling element through the ring or rings of the other element.

Fig. 2 is an enlarged fragmental cross-sectional view of the joint after the hose ends have been telescoped and before the said coupling rings have been pulled into interlocked position.

Fig. 3 is a view similar to Fig. 2 and shows the completed joint with the said rings held interlocked by the split rings.

Fig. 4 is a detail view of the split rings.

Similar reference numerals refer to similar parts throughout the drawings.

In the embodiment of my invention illustrated, I show two hose sections 1 and 2, each made up of any suitable flexible fabric water-proofed and having at each end a coupling element comprising two spaced parallel annular pockets 3 and 4, formed by stitching the folded in end of the hose on itself, and in the outer pocket 3 I mount a solid annular ring 5 and in the inner pocket 4 I mount a split ring 6. These rings 5 and 6 are shown as having a rectangular cross section, but it is to be understood that this is merely the preferred shape. The tips of the split ends of the rings 6 are rounded to avoid tearing or cutting the pocket walls 4 as the ring is expanded or contracted. I have shown both coupling elements equipped with the rings 5 and 6, but it is within the contemplation of my invention that the split ring 6 needs to be used on only one coupling element at each joint.

In assembling my joint the ring or rings of the coupling element that is to be telescoped within the other coupling element are deformed or flattened sufficiently to be inserted endwise through such latter element as is indicated by the dotted lines in Fig. 1, and when thus inserted and released the rings of the inner element will expand and resume their normal annular shape after which they are first drawn into position parallel with the rings in the outer coupling element. To complete the joint the hose ends are then pulled further apart, causing the split rings 6 to first pass each other, the outer ring expanding and the inner ring contracting, after which the inner split ring 6 is again contracted sufficiently to pass the outer solid ring 5 while the inner solid ring 5 will expand and pass through the outer split ring 6. This completes the joint, and as seen in Fig. 3, the solid rings 5 stand parallel and interlock to hold the joint positively against strains or stresses tending to draw the hose ends apart, and the spit ring or rings 6 will hold them in such interlocked relation and prevent any accidental displacement which will make it possible for the joint to part. As stated, I prefer to use the two rings 5 and 6 in each coupling element, as I thereby avoid male and female joint members, but it is obvious that a split ring 6 on only one coupling element will serve to hold the two solid rings 5 interlocked. To disconnect the joint the split rings 6 are expanded or contracted, according to whether they are in the inner or outer coupling elements so as to permit the solid rings 5 to be moved out of engagement and brought into relative position to permit the ring or rings of the inner coupling element to be deformed and drawn outwardly through the ring or rings of the outer coupling elment.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. In a ventilating air hose and the like, hose sections having end joint elements adapted to telescope, each element comprising a solid ring adapted by angular disposition and deformation to be passed through the solid ring of the other element and when parallel with the latter to interlock with it, and yieldable means to hold said solid rings interlocked.

2. A ventilating air hose and the like according to claim 1, in which the yieldable means is a spring.

3. A ventilating air hose and the like according to claim 1, in which the yieldable means is a split ring adapted to expand or contract and having substantially the diameter of the solid rings.

4. A coupling for flexible hose, comprising two elements adapted to telescope, each element comprising solid rings adapted to pass only by deformation when in relative angular relationship, and at least one element having a split ring disposed and adapted to permit a solid ring to pass it while in parallel relation and assume position between it and the solid ring of its respective element.

5. A coupling according to claim 4, in which the solid and split rings in a coupling element are disposed in parallel relation and spaced to receive snugly between them the solid ring of the other coupling element.

6. A coupling according to claim 4, in which each coupling element comprises a split ring, said split rings being disposed on each side of the solid rings when interlocked in an assembled joint.

7. A coupling according to claim 4, in which each coupling element comprises a split ring, said split rings being closely juxtaposed on each side of the solid rings when interlocked in an assembled joint and adapted yieldably to hold said solid rings interlocked.

In testimony whereof I affix my signature.

WILLIAM HOOPER EVANS.

Witness:
S. E. PHILLIPS.